July 13, 1926.

M. A. DE LEW ET AL 1,592,021

DETACHABLE FLYWHEEL ASSEMBLY FOR ELECTRIC OIL WELL COUNTERSHAFTS

Filed Feb. 24, 1926

INVENTORS
Maurice A. de Lew
Lewis R. Smith
by Booth & Booth
ATTORNEYS

Patented July 13, 1926.

1,592,021

UNITED STATES PATENT OFFICE.

MAURICE A. DE LEW, OF SAN FRANCISCO, AND LEWIS R. SMITH, OF LOS ANGELES, CALIFORNIA.

DETACHABLE FLYWHEEL ASSEMBLY FOR ELECTRIC OIL-WELL COUNTERSHAFTS.

Application filed February 24, 1926. Serial No. 90,333.

Our invention relates to oil-well machinery. It consists in a novel assembly comprising a flywheel and a countershaft, by which the power of an electric motor is economically transmitted to the bull-wheel shaft of the walking-beam connection.

It has long been recognized that the efficiency of a continuously operating prime mover directed through a walking-beam is decidedly lowered, due to the gravity of the connected instrumentalities on the down stroke. Heretofore in the use of steam engines as prime movers, their general waste is so great that the additional inefficiency in the environment referred to has been passed over, and engines are provided of maximum capacity for all needs. But in the advance of the art involving the use of electric motors, it is realized that such procedure is uneconomical; and attempts have been made to remedy the matter, as far as possible, by the provision of a flywheel. This, however, does not fully solve the difficulty, since there are conditions of operation, such for example, as the "pulling" of the well, that is, the removal of the pump and tubing string from the bore, which involve a frequent stop and start of the motor, an obviously uneconomical proceeding because of the necessity of repeatedly overcoming the inertia of a heavy flywheel.

The best result, as we have found in practice, is reached by an asembly in which the flywheel is associated with the countershaft in such manner and by such means that it can be secured to the countershaft for rotation therewith, and released therefrom for the free running of said countershaft, both operations being relatively easy and practicable to perform. This, then, is the object of our invention, and its nature will be readily ascertained from the following description in connection with the accompanying drawings in which Fig. 1 is a diagrammatic view showing, in general plan, an assembly of parts which includes as its novel feature our detachable flywheel and countershaft, the details of which are, however, left for Fig. 2 to disclose, the latter figure being an elevation, partly in section, of said last named parts.

Figure 1:
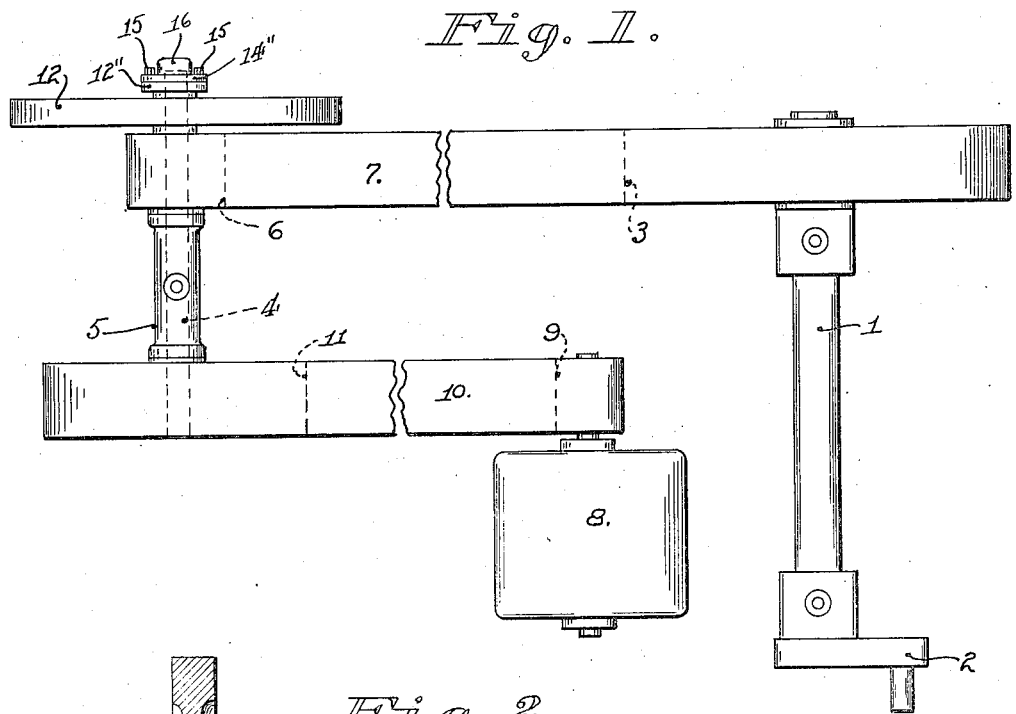

Referring to Fig. 1 the numeral 1 indicates a shaft having a crank 2 for connection with a walking-beam (not shown) and a pulley 3 which is commonly known as a bull-wheel, 4 is a counter shaft mounted in a journal 5, and having a pulley 6 from which a belt 7 passes to the bull-wheel 3.

8 is an electric motor, from the driving pulley 9 of which a belt 10 passes to a pulley 11 on the countershaft 4.

Upon the countershaft 4 is a flywheel 12.

Figure 2:
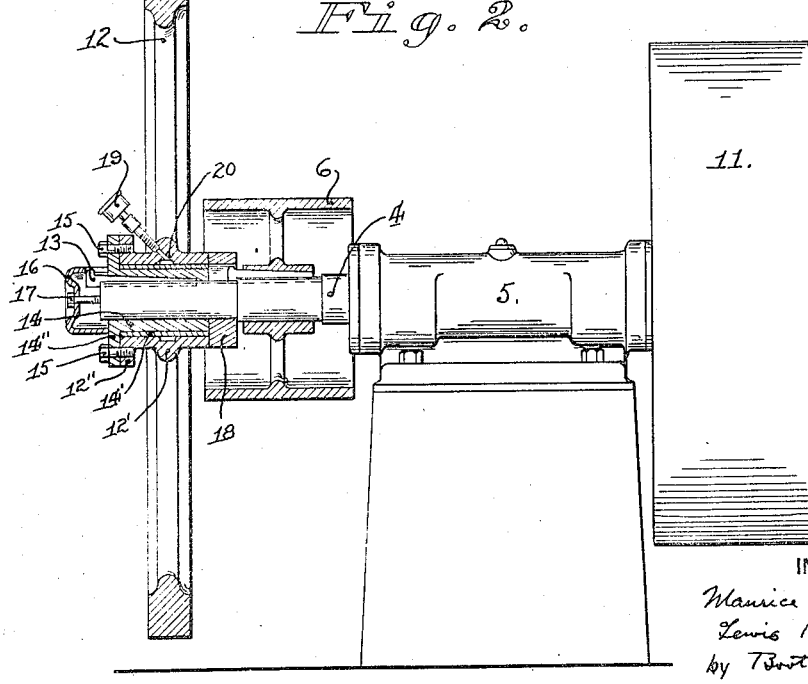

Referring now to Fig. 2, the detachable connection between the flywheel 12 and the countershaft 4 will be seen. Upon the end of the countershaft is rigidly fixed by a key 13 a bearing sleeve 14 having a bushing 14' and an end flange 14''.

The hub 12' of the flywheel 12 is fitted, freely upon the bushing 14' and said hub has an end flange 12''.

Bolts 15 passing through the flanges 14'' and 12'' detachably connect the flywheel and the sleeve, and as the sleeve is keyed to the countershaft the detachable connection of the flywheel is thus extended to the shaft.

When the bolts 15 are in place, the flywheel will rotate with the countershaft, but when removed, the countershaft can rotate freely within the hub of the flywheel. 16 is a cap fitted by a screw 17 to the end of the countershaft and adapted to protect the key 13.

18 is a thrust collar between the flywheel hub 12' and the shaft pulley 6. 19 is a grease cup and 20 is a groove formed in the flywheel hub 12' for lubricating the meeting surfaces of said hub and the bushing 14'.

We claim:—

1. In power transmitting connections the combination of a shaft; a bearing sleeve fixed on said shaft for rotation therewith, said sleeve having an end flange; a flywheel in the hub of which the bearing sleeve is freely fitted for rotation independently of said flywheel, said hub having an end flange; and bolts detachably connecting the end flanges of the bearing sleeve and the flywheel hub.

2. In power transmitting connections the combination of a shaft; a bearing sleeve fixed on said shaft for rotation therewith, said sleeve having an end flange; a flywheel in the hub of which the bearing sleeve is freely fitted for rotation independently of said flywheel, said hub having an end flange; a bushing between said bearing sleeve and hub; and bolts detachably connecting the end flanges of the bearing sleeve and the flywheel hub.

3. In power transmitting connections especially adapted for well machinery, including a main shaft and a motor, and in combination with said main shaft and motor, a countershaft; means connecting said countershaft with said main shaft and motor respectively; a bearing sleeve fixed on the countershaft for rotation therewith, said sleeve having an end flange; a flywheel in the hub of which the bearing sleeve of the countershaft is freely fitted for rotation independently of said fly wheel, said hub having an end flange; and bolts detachably connecting the end flanges of the bearing sleeve and the flywheel hub.

4. In power transmitting connections especially adapted for well machinery, including a main shaft and a motor, and in combination with said main shaft and motor, a countershaft; means connecting said countershaft with said main shaft and motor respectively; a bearing sleeve fixed on the countershaft for rotation therewith, said sleeve having an end flange; a flywheel in the hub of which the bearing sleeve of the countershaft is freely fitted for rotation independently of said flywheel, said hub having an end flange; a bushing between said bearing sleeve and hub; and bolts detachably connecting the end flanges of the bearing sleeve and the flywheel hub.

In testimony whereof we have signed our names to this specification.

MAURICE A. DE LEW.
LEWIS R. SMITH.